UNITED STATES PATENT OFFICE.

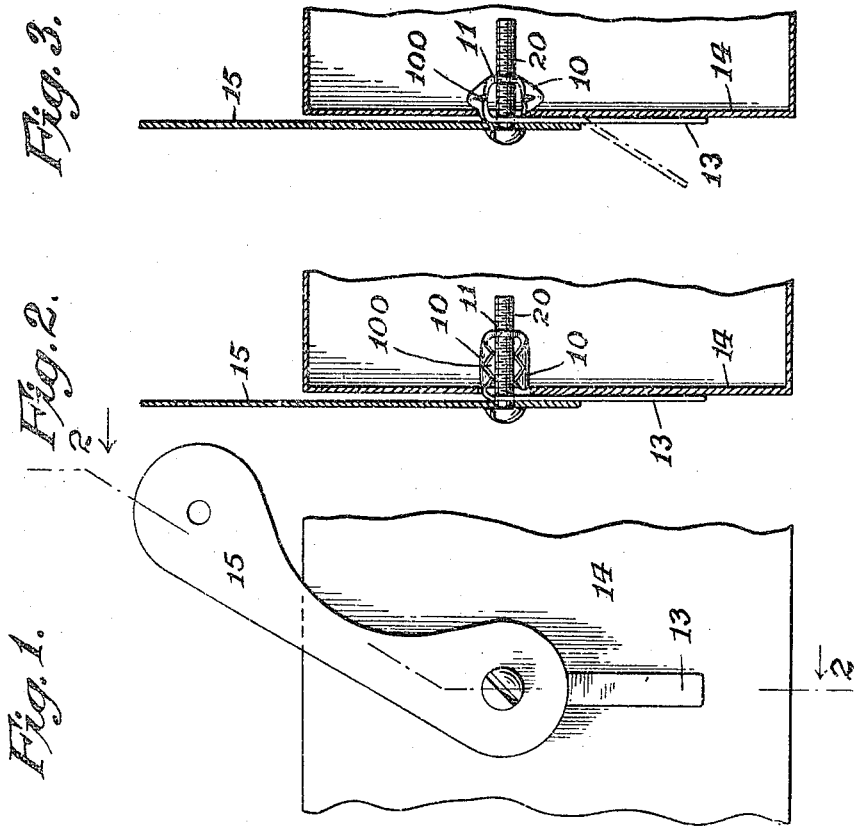

CARL JOSEPH, OF BAYONNE, NEW JERSEY.

FASTENER.

959,545.

Specification of Letters Patent.

Patented May 31, 1910.

Application filed February 23, 1909. Serial No. 479,462.

*To all whom it may concern:*

Be it known that I, CARL JOSEPH, a subject of the German Empire, and resident of Bayonne, Hudson county, New Jersey, have invented certain new and useful Improvements in Fasteners, of which the following is a specification.

My invention relates to fasteners adapted to be employed in securing articles, such as brackets, against surfaces inaccessible from the rear, such as hollow window frames, made of sheet metal, and its novelty consists in the construction and adaptation of the parts as will be more fully hereinafter pointed out.

Fasteners for the purpose have been made and they have comprised expansible and collapsible bodies placed at the inaccessible rear of the surface but when screws are employed with such fasteners a difficulty which commonly arises is that the rotation of the screw will also rotate the fastener and it is difficult to make a good and secure engagement. I have overcome this by providing a fastener with an outer extension member which can be held to prevent such rotation and I have further provided means whereby such extension may be readily detached and thrown away. Another disadvantage of the ordinary fastener is that if the yielding character of the material of which the body of the fastener is composed is relied upon to secure its collapse and expansion under strain, such a body is apt to yield unevenly laterally and to expand irregularly twisting the screw and making a bad joint which may work loose. I provide means whereby the body of the fastener is weakened regularly and uniformly and in such direction that when it does expand and collapse it does so evenly and regularly and the screw is not twisted or turned out of line or brought to an acute angular position with respect to the surface against which it is acting.

In the drawings, Figure 1 represents a side elevation of a bracket secured against a hollow wall with the extension piece undetached; Fig. 2 is a vertical section of the same showing the body of the fastener in position back of the wall, but not expanded; Fig. 3 is a view similar to Fig. 2 showing the body of the fastener collapsed and indicating in dotted line the detachment and removal of the extension member; Fig. 4 is a perspective of the entire fastener; Fig. 5 is a top plan view thereof; Fig. 6 is a central longitudinal section of the same on the plane of the line 6—6 in Fig. 5, and Fig. 7 is a rear elevation of the body of the fastener.

In the drawings, the body of the fastener which is preferably made of soft metal, comprises longitudinal members 10, 10, a transverse inner member 11 and a transverse outer member 12. Both of the transverse members are provided with apertures 110 and 120 respectively, and the aperture of the inner member is threaded to receive a screw indicated at 20. The longitudinal members may be of any number greater than one and each is provided with means whereby it is weakened preferably by forming along its edges indentations or depressions 100 which are preferably made V-shaped. The outer member 12 is provided with a lateral extension 13 preferably made in the form of a flat bar suitably secured to or made integral with the longitudinal members and which extension is weakened so that it may readily be removed. The method of weakening which I prefer is to arrange a series of scoring cuts, indicated at 130 transversely across its outer surface.

The hollow or other surface against which the article is to be fastened is indicated at 14. It is provided with a suitable aperture to admit of the passage of the body of the fastener but not of the extension member. The article to be secured is indicated at 15.

The method of using the device is first to insert the body of the fastener through an aperture in the wall against which the bracket or other article 15 is to be fastened. Then to insert the screw 20 through a hole in the article and through the holes 120 and 110 in the fastener and gently rotate the screw until its threads engage those of the inner member 11. Then hold the extension member 13 to prevent the body of the fastener from turning and rotate the screw until the longitudinal members 10 collapse and expand as shown in Fig. 3. The extension piece 13 is then broken off by bending it where it is scored or weakened.

What I claim as new is:—

1. A fastener adapted for use in securing articles to the front of a surface inaccessible from the rear, comprising a soft metal body having an inner transverse member and an outer laterally extending member weakened in one or more places.

2. A fastener adapted for use in securing articles to the front of a surface inaccessible from the rear, comprising a soft metal body, consisting of two transverse apertured members and a plurality of intermediate longitudinal members, each of the latter having depressions along their edges, one of the transverse members being weakened in one or more places.

3. A fastener adapted for use in securing articles to the front of a surface inaccessible from the rear, comprising a soft metal body, consisting of two transverse apertured members, and a plurality of intermediate longitudinal members, each of the latter having one or more V-shaped recesses along each edge and one of them being extended laterally to form a hand hold.

4. A fastener comprising inner and outer transverse members, the latter extended laterally and weakened in one or more places whereby its extremity may readily be removed, and intermediate longitudinal members also weakened in one or more places whereby they may readily be collapsed.

5. A fastener adapted for use in securing articles to the front of a surface inaccessible from the rear, comprising a soft metal body having an inner transverse member and an outer laterally extending member weakened in one or more places by transverse scoring.

Witness my hand this 19th day of February 1909, at New York, N. Y.

CARL JOSEPH.

Witnesses:
WILLIAM R. BAIRD,
ALAN C. McDONNELL.